Dec. 3, 1963   J. HAW   3,112,797
PROPELLER BLADES
Filed July 13, 1959   3 Sheets-Sheet 3
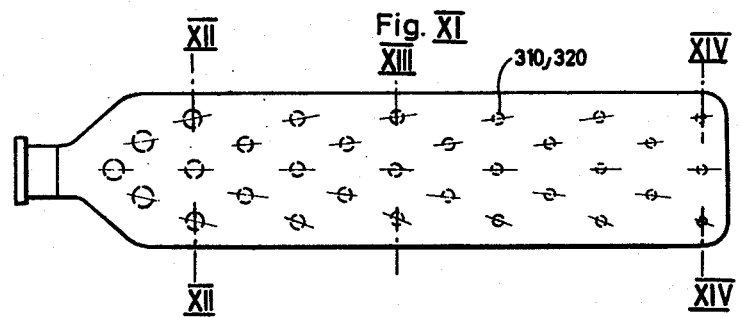
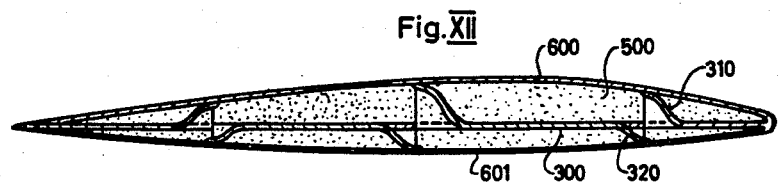
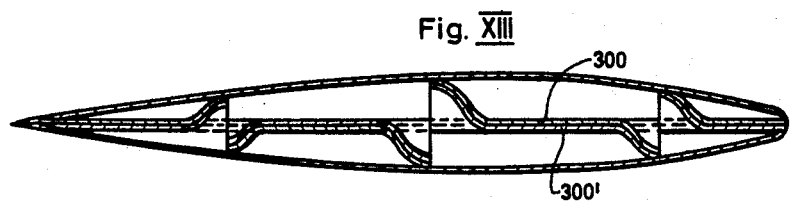
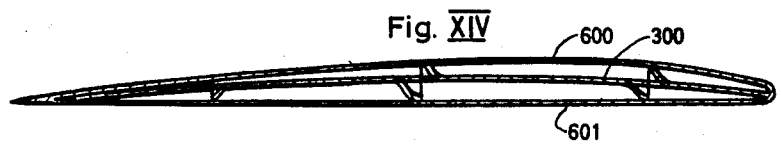

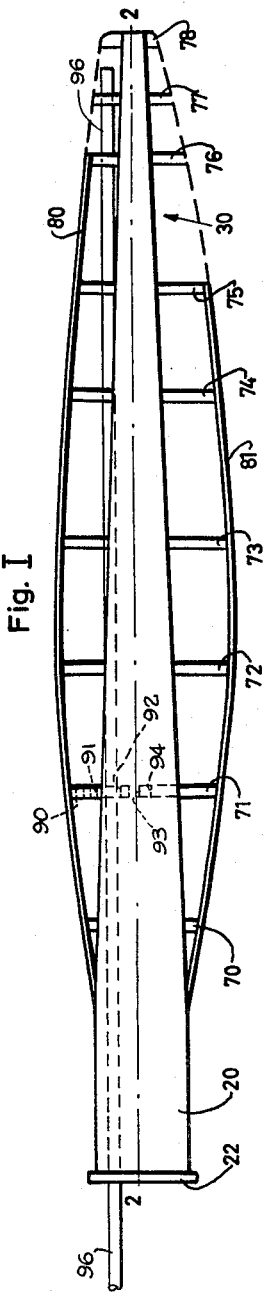
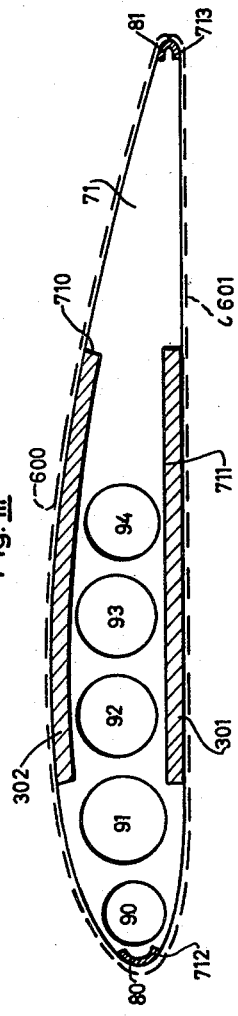

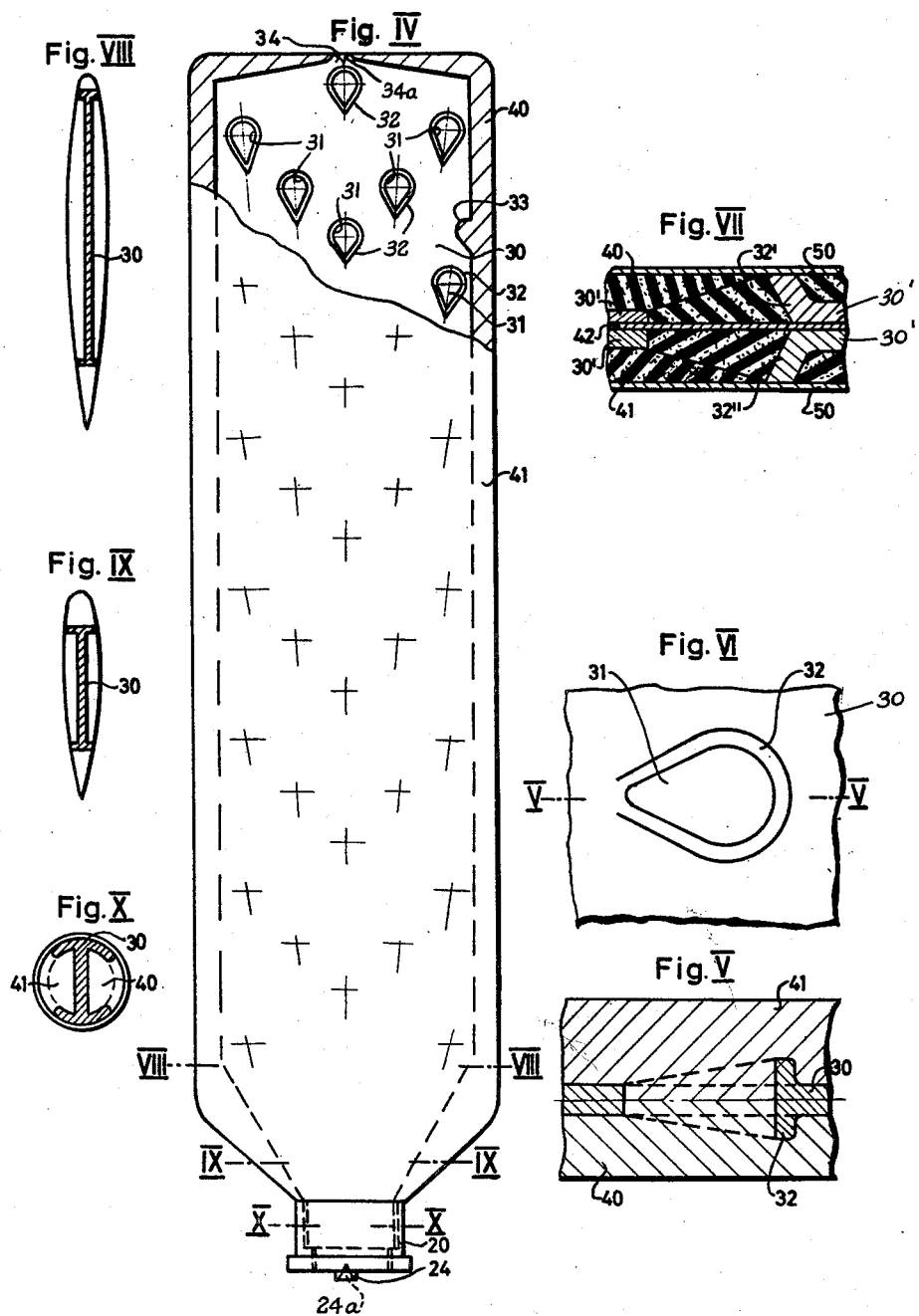

United States Patent Office 3,112,797
Patented Dec. 3, 1963

3,112,797
PROPELLER BLADES
Jakob Haw, deceased, late of Berlin-Wilmersdorf, Germany, by Max Reichelt, Berlin-Charlottenburg, Germany, administrator, assignor to Deutsche Propellerbau Gesellschaft Haw & Co., Berlin-Charlottenburg, Germany, a German corporation
Filed July 13, 1959, Ser. No. 826,758
5 Claims. (Cl. 170—159)

This invention is concerned with propeller blades adapted for use in connection with the propulsion of ships, aircraft, helicopters, wind driven generators, ventilators, exhausters, and the like.

Propeller blades are highly stressed when propelling ships or aircraft and, in order to reduce or relieve fatigue stress of the shell or mantle of the hollow blade, interiorly arranged tension rods, struts or the like were provided to which the centrifugal load and stresses were transmitted. It is known that vibration dampers were fitted to the interior tension members, such as light metal vibration dampers and further additional damping materials. Tension members or a skeleton consisting of sheet metal were suggested, with layers of non-ferrous material screwed or riveted thereon. Layers of non-ferrous material reinforced with sheet metal and interconnected by various means have been tried before. Efforts known so far to build vibration proof or vibration resisting propeller blades, especially airscrew blades, were not satisfactory.

The present invention proposes ways and means to be employed in conjunction with vibration proof or vibration resisting airscrew blades. According to the invention, vibration dampers are fitted to the tension member or skeleton in such a manner, for example by welding, that they form or make up a rigid single piece with the tension member. The tendency of the airscrew blade to vibrate in operation is thereby counteracted and is successfully damped or eliminated by the counteracting additional mass of the tension member or skeleton.

The tension members are solely affected by their own centrifugal load. The vibration dampers are thereby free of centrifugal loads produced by the shell or mantle of the hollow blade or tension member, thus maintaining a uniform stress level in the tension member and avoiding any sudden stress changes. The shape of the vibration dampers should be of an aerofoil section conforming with the blade section so that the vibration dampers can be made use of as ribs or stiffeners for the hollow blade shell. The aerofoil ribs or dampers can vary dimensionally and in weight and can be spaced or arranged so that the centrifugal bending moments produced by the centrifugal force of one or all ribs can be varied in magnitude and position if required. The tension member or skeleton can be regarded as a cantilever beam supported at one end and by spacing or positioning the ribs in a suitable manner; the effective length of the beam, that is, the spacing between the ribs can be arranged according to requirements.

Further details, features and objects of the invention will appear from the description rendered below with reference to the accompanying drawings, wherein FIG. I is a schematic plan view of a tension member of a propeller blade (blade shell omitted);

FIG. II shows a section taken along line 2—2 of FIG. I;

FIG. III represents on an enlarged scale the arrangement of an aerofoil rib;

FIG. IV illustrates a further example of a section of a propeller blade;

FIGS. V and VI illustrate, on an enlarged scale, one of the cutouts 31 and collars 32, illustrated in FIG. IV, FIG. V being a sectional view taken approximately on the line V—V of FIG. VI;

FIG. VII is a longitudinal section, similar to FIG. V, of a modified form of collar;

FIGS. VIII, IX and X represent on a reduced scale cross sections along lines VIII—VIII, IX—IX and X—X of FIG. IV;

FIG. XI indicates a further example of a propeller blade in plan view; and

FIGS. XII, XIII and XIV show cross sections along lines XII—XII, XIII—XIII, XIV—XIV of FIG. XI.

FIG. 1 shows only the tension member 30 with fixed vibration dampers 70—78. The shell of aerofoil shape which is mounted over these parts is indicated in dash lines in FIG. III. One end of the tension member, that is, the part which becomes the root of the blade is of cylindrical shape 20 and is equipped with a shoulder 22 for holding the blade on the hub. The tension member can for example be fashioned from a suitable tube which tapers down from the root of the blade towards the tip thereof. Starting at the cylindrical part of the tube, that is, the root of the blade, the tube is over the entire length molded or formed to conform exactly with the desired thickness of the airscrew blade. The leading and trailing edges are partially cut away over a certain length so that two forklike longitudinal flanges 301 and 302 remain. When the blade is completely assembled, such flanges will be positioned inside the hollow blade shell, that is, they will form part of the respective structures at the suction and pressure sides of the blade. The flanges represented in FIGS. II and III make up the top 302 and and bottom 301 flange of the so called cantilever beam which can best be described as a tension member of a forklike shape running from the root to the tip of the blade.

If desired, two plates of tapered wall thickness can be suitably shaped and used instead of a tube.

Between the top and bottom flanges of such a tension member vibration dampers are firmly fixed. The example shows ribs 70—78 which are over the area of contact with the tension member welded or soldered thereto, resulting in a rigid cantilever beam or unit. The size or shape of the ribs 70—78 are in exact conformity with the aerofoil section of the inside of the blade shell or mantle thus supporting the shell without being attached or fixed thereto.

A further point of utmost importance is that by suitable spacing of the ribs 70—78, between the forklike flanges of the tension member, a cantilever beam is formed, any desired effective length of which can be arranged between the ribs. If desired, this effective length can be arranged so that the center of vibrations coincides exactly with the position of one or more ribs. Owing to the bending of the tension member, vibrations are in this manner prevented from being transmitted to the outer blade shell mantle.

The cross sectional area of the top and bottom flange 301 and 302 can be so arranged that a uniform stress level resulting from centrifugal loads is maintained from the blade tip to the root of the blade. The top and bottom flanges 301 and 302 can be pre-positioned with regard to the sense of rotation of the airscrew so that the respective center of gravity of the aerofoil section is placed in the most favorable position. The advantage of counteracting forces in this manner cannot be applied to airscrews with ordinary solid or hollow blades. Torque forces on the propeller blade can be counteracted by pre-positioning the center line of gravity of the blade with regard to the longitudinal and rotational axis thereof.

The ribs 70—78 are interconnected by means of members 80, 81 along the leading and trailing edges which also reinforce or stiffen the leading and trailing edge seam of the blade shell 600 and 601 consisting of two halves, that is, pressure side and suction side half, after the two shell halves have been welded or soldered to the top and bottom flange 302 and 301 of the tension member. The ribs can vary in their dimensions and position in order to adjust their own centrifugal load according to requirements. As can be seen from FIG. I, the spacing between the ribs 70—78 varies and the width of the rib 78 exceeds that of the other ribs. The width of the ribs may also vary from the leading edge or trailing edge towards their point of contact with the top and bottom flange 301 and 302 of the tension member 30, for instance, it may taper if desired for reasons of adjusting centrifugal loads or pre-positioning the center of gravity.

The ribs may be provided with holes for lightness, positioned so that the center of gravity is shifted and also so that one or a number of holes in the ribs register so that they can be used for alignment operations by means of assembly rods such as the rod 96.

FIG. III shows on a larger scale a rib 71 which is provided with holes 90—94 arranged preferably in the nose part of the areofoil rib so that the center of gravity of the aerofoil rib is shifted towards the trailing edge, the rod 96 being illustrated in FIG. 1 as inserted in the hole 92.

Recesses 710 and 711 are formed for the purpose of inserting the top and bottom flanges 302 and 301 of the tension member 30. By varying the position of the recesses in the rib, that is, either towards the leading or trailing edge, the center point of gravity of the blade section may be shifted to either side. The ribs are also recessed at the leading and trailing edge 712 and 713 as may be seen from FIG. III, for inserting the reinforcing members 80 and 81.

The pressure and suction side halves 601 and 600 are welded or soldered together along the reinforcing members 80 and 81 and also to the top and bottom flanges 302 and 301 of the tension member 30.

The example shown in FIG. IV is for reasons of simplicity shown without any pitch and the tension member 30 is arranged in the interior of the blade. (See FIGS. VII–X.) The root 20 of the blade which can be seen in FIG. IV is in the usual manner fitted or held in a hub. Blocks 24, 34 are provided on the root and tip of the blade with corresponding centering holes 24a, 34a formed therein for centering the blade in a lathe. As can be seen in this example the tension member and the ribs form a single piece which is fashioned with cutouts 31 formed in the tension member, the material which is left between the cutouts forming collars 32 (FIGS. V and VI) or 32', 32" shown in FIG. VII. The ribs produced in this manner act as stiffeners which dampen or suppress vibrations. The aerofoil shell halves of the blade 50 are reinforced by the collars 32' and 32" as in the first example.

It is also possible to insert a filler 40 and 41 (FIG. V and VII) into the interior of the blade. A suitable material as filler would be foam rubber or other aerated materials having a high coefficient of friction acting at the same time as vibration dampers. The foam filler 40 and 41 may be so arranged that the centrifugal loads acting thereon are transferred onto the ribs 32.

The part as shown in FIG. VII is a tension member consisting of two parts 30' and 30", arranged at two sides of a packing 42 in such a manner that the tension member 30' with the ribs 32' and the other part of the tension member 30" with the ribs 32" extend respectively into the filler 40 and 41.

A third example is shown in FIG. XI–XIV. Vibration dampers connected rigidly with the tension member can also be fashioned in such manner that spherical protrusions are made into the tension member at symmetrically spaced positions. The example shows a symmetrical protrusion extending altenatively upwardly and downwardly. The tension member 300 is in this case connected to the aerofoil shell 600 and 601 by welding or soldering at the ribs 310 and 320. The space between tension member 300 and aerofoil shell 600 can be filled with light material 500.

The new type of airscrew is suited for very thin aerofoil sections having a surface polished to the utmost, as used for flying at supersonic speeds and at great heights. The leading edge can be razor sharp.

Changes may be made within the scope and spirit of the appended claims which define what is believed to be new and desired to have protected by Letters Patent.

I claim:

1. A propeller blade comprising a tension member arranged inside thereof onto which forces acting on the blade are transferred, said tension member being provided with individual spaced apart vibration damping ribs forming part thereof and rigidly connected thereto, with said ribs extending between the leading and trailing edges of the blade, said tension member being comprised of beam flanges forming a fork, said flanges each being disposed adjacent a respective face of the blade, with the intermediate portions of said damping ribs being disposed between the beam flanges of said tension member and firmly connected thereto.

2. A propeller blade according to claim 1, wherein the spacing between said ribs determines the effective beam length of the tension member, and reinforcing means for interconnecting said ribs at the leading and trailing edges.

3. A propeller blade according to claim 2, wherein the dimensions of said ribs and the spacing therebetween is approximated to the centrifugal loads acting thereon.

4. A propeller blade according to claim 3, wherein said ribs are of varying widths in the direction of the tension member.

5. A propeller blade according to claim 4, wherein said ribs are provided wtih holes formed therein, the holes of a plurality of ribs being in register for the purpose of inserting assembly means therethrough.

References Cited in the file of this patent

UNITED STATES PATENTS

| | | |
|---|---|---|
| 2,248,221 | Dornier | July 8, 1941 |
| 2,566,701 | Griese | Sept. 4, 1951 |
| 2,589,193 | Mayne | Mar. 11, 1952 |
| 2,638,990 | Pitcairn | May 19, 1953 |
| 2,642,263 | Thorp | June 16, 1953 |
| 2,698,666 | Camping et al. | Jan. 4, 1955 |
| 2,918,977 | Fedan et al. | Dec. 29, 1959 |